2 Sheets—Sheet 1.

D. M. HOLMES.
CAKE-MACHINE.

No. 188,366. Patented March 13, 1877.

WITNESSES:
A. W. Almquist
J. H. Scarborough

INVENTOR:
D. M. Holmes,
BY
ATTORNEYS.

N. PETERS, PHOTO-LITHOGRAPHER, WASHINGTON, D. C.

2 Sheets—Sheet 2.

D. M. HOLMES.
CAKE-MACHINE.

No. 188,366. Patented March 13, 1877.

WITNESSES
A. W. Almquist
J. H. Scarborough

INVENTOR:
D. M. Holmes
BY
ATTORNEYS.

N. PETERS, PHOTO-LITHOGRAPHER, WASHINGTON, D.C.

UNITED STATES PATENT OFFICE.

DANIEL M. HOLMES, OF NEW YORK, N. Y., ASSIGNOR TO J. CUTLER FULLER, OF ORANGE, N. J., AND MARTHA G. HOLMES, OF NEW YORK, N. Y.

IMPROVEMENT IN CAKE-MACHINES.

Specification forming part of Letters Patent No. 188,366, dated March 13, 1877; application filed January 6, 1877.

*To all whom it may concern:*

Figure 1:
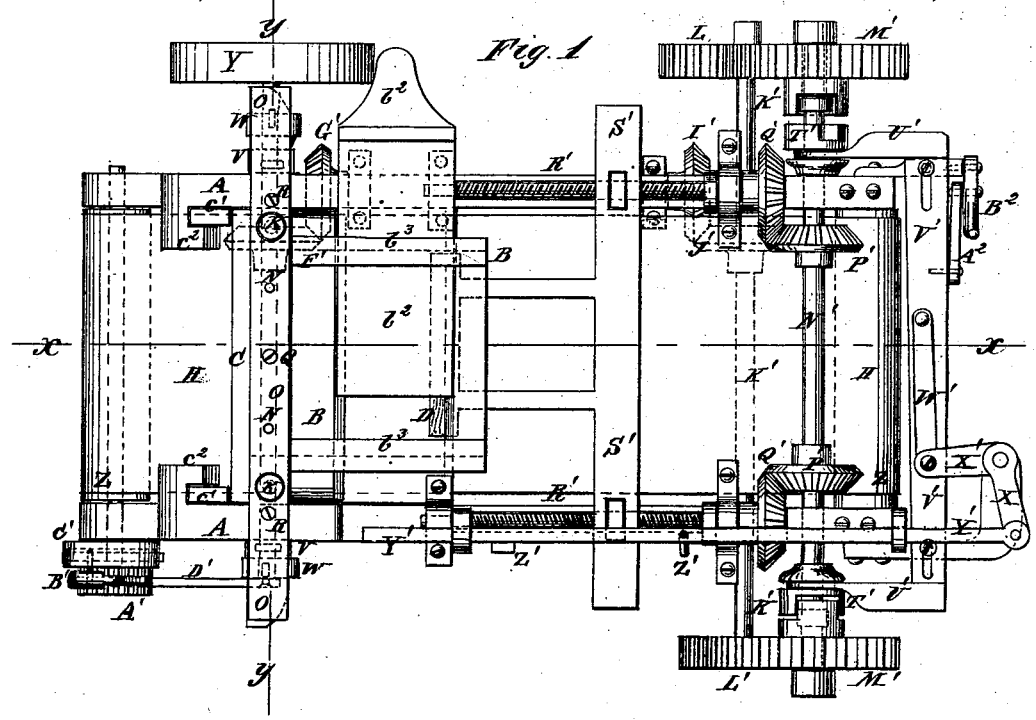
Figure 2:
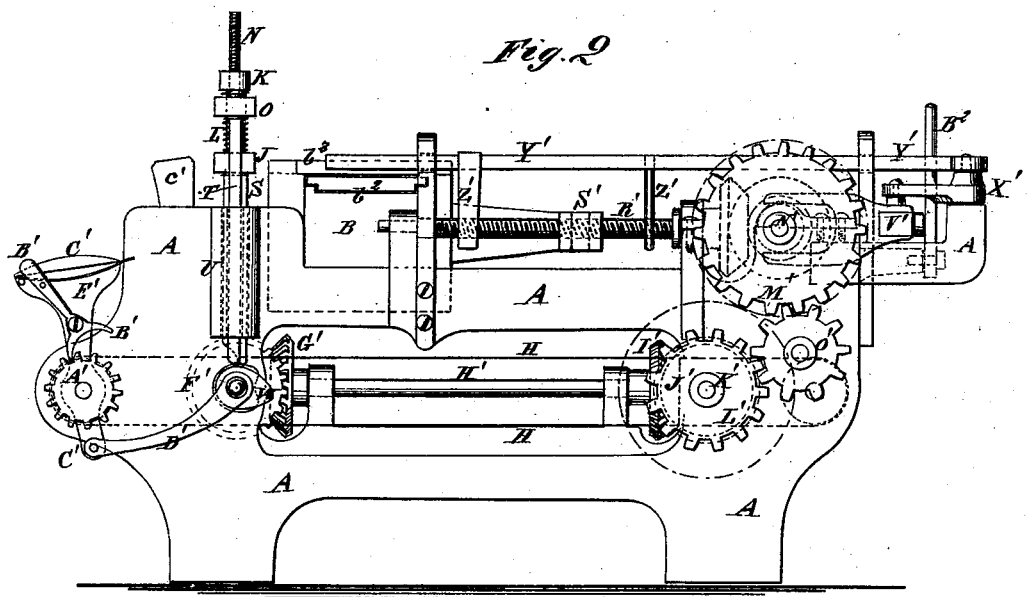
Figure 3:
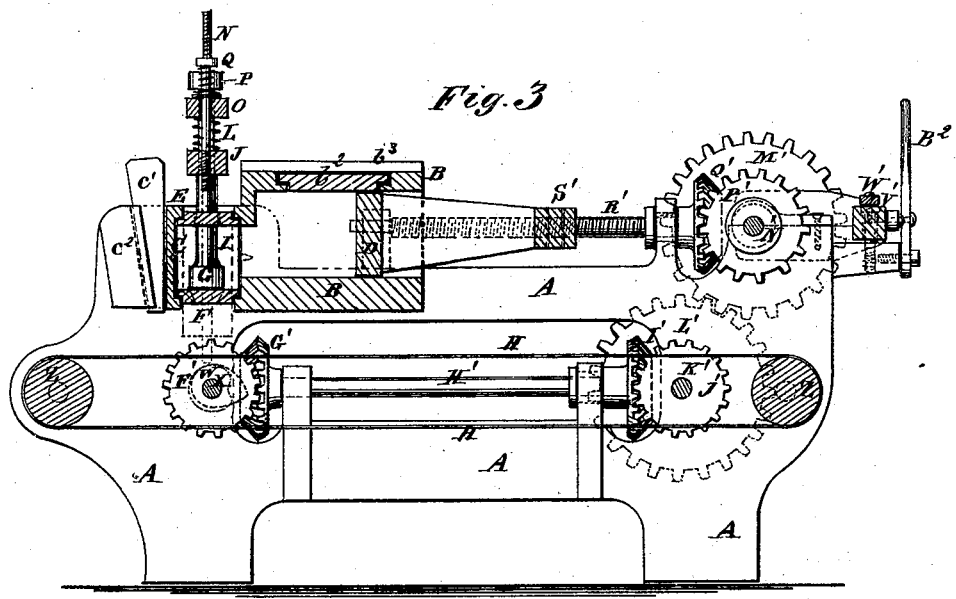
Figure 4:
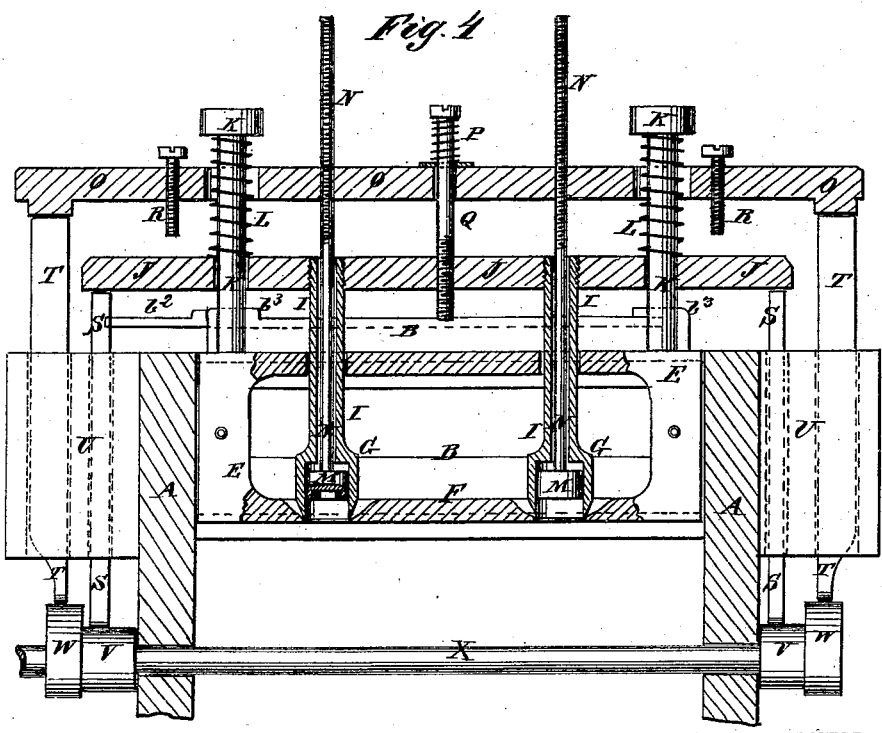

Be it known that I, DANIEL M. HOLMES, of the city, county, and State of New York, have invented a new and useful Improvement in Cake-Machine, of which the following is a specification:

Figure 1, Sheet 1, is a top view of my improved machine. Fig. 2, Sheet 1, is a side view of the same. Fig. 3, Sheet 2, is a vertical longitudinal section of the same, taken through the line $x\,x$, Fig. 1. Fig. 4, Sheet 2, is a vertical cross-section of the same, taken through the line $y\,y$, Fig. 1.

Similar letters of reference indicate corresponding parts.

The object of this invention is to improve the construction of the machine for making cakes—such as jumbles, kisses, drops, macaroons, &c.—of soft dough, for which Letters Patent No. 174,244 were issued to me February 29, 1876, so as to make it more convenient in use and more reliable in operation.

The invention consists in the combination of movable plungers with the hollow cutters, the cutter-plate, and the dough-box of a cake-machine; in the combination of the plungers, the cross-bar and its spring and stops, the two pairs of sliding bars, and the two pairs of cams with the cutters and their cross-bar and the driving-shaft; in the combination of the ratchet-wheel, the forked pawl, the lever, the spring, and the connecting-rod with the roller of the endless carrier, and with the driving-shaft; in the combination of the slide-bar, provided with the two arms, the bent lever, and the sliding bar, provided with the two forked arms, with the cross-bar of the plungers and the two clutches, for throwing the gear-wheels into and out of gear with the swiveled screws that operate the plungers; and in the combination of the two gear-wheels and the three gear-wheels with the two shafts, to enable one of said shafts to be driven in either direction by the continuous movement of the other in the same direction, as hereinafter fully described.

A is the frame of the machine, to the upper forward part of which is attached the dough-box B. The dough is fed into the upper part of the dough-box B from a hopper, or by other suitable means.

The dough-box B may be made in one or more compartments, and is provided with as many plungers D as there are compartments, which plungers enter through the rear side of the said dough-box. The object of this construction is this: The dough is soft, and must be discharged downward. If the plungers worked vertically they would have to be raised to a considerable height before the dough could be put into the dough-box, which would cause a great loss of time in working the machine. When the plungers work horizontally the top of the dough-box can be opened, and the dough can be put in while the plungers are receding, so that the plungers need be drawn back no farther than to give space for the charge, and no time need be lost.

The open top of the dough-box B is closed with a sliding cover, $b^2$, to prevent the dough from being pushed out of said open top by the action of the plungers, and which is held against the upward pressure of the dough by cleats $b^3$ or other supports. Upon the forward side of the dough-box B is formed an extension, E, the bottom F of which is at a lower level than the bottom of the main part of said dough-box B. The bottom F of the extension E of the dough-box B is secured detachably in place, so that it can be detached, and replaced, by another having larger or smaller openings, when desired, and in it are formed one, two, or more round holes, which are deeply beveled off or countersunk from the upper side, and slightly beveled upon the lower side, as shown in Figs. 3 and 4. The extension E F is secured in place by dowel-pins and by the board C, placed against its forward side, and held against it by wedge-keys $c^1$, driven between it and the grooved blocks $c^2$, attached to the frame A.

G are the ring-cutters, which are made in the shape of hollow cylinders, with closed upper ends, and with the outer sides of their edges beveled off with a longer bevel than the bevel of the holes through the bottom or cutter plate F, so that when the cutters G are forced down, their extreme edges may come in contact with the extreme edges of the holes in the cutter-plate, and separate or pinch off the dough.

The cutters G are never raised entirely out of the holes in the bottom plate F, so that when the dough is pressed down and out by the advance of the plungers D, it passes out upon all sides of the cutters G, and drops as a ring upon the pans placed beneath the bottom plate F upon the endless carrier H.

The stems I of the cutters G are made hollow, pass up through the top of the extension E, and their upper ends are attached to the cross-bar J, which moves up and down upon guide-pins K, attached to the extension E, near its ends, and is forced down to cause the cutters G to make a cut, by the spiral springs L, placed upon the upper part of said guide-pins, and the upper ends of which rest against the heads of the said pins K.

Within the cavity of the cutters G are placed cylindrical plungers M, the lower ends of which are concaved, the stems N of which pass up through the hollow stems I of the cutters G, and are attached to the cross-bar O. The cross-bar O is placed above the cross-bar J, and is kept in place by the guide-pins K, the holes for the passage of the said guide-pins K being made large enough to allow the spiral springs L to pass through and work freely in them. The cross-bar O is forced downward to disengage the ring of dough from the cutters G by the spiral spring P, placed upon the upper part of the screw Q, which passes down through the bar O, and is screwed into the cross-bar J. The point to which the plungers M descend in the cutters G is regulated by the set-screws R, which pass down through the said cross-bar O, so that their lower ends may strike against the said cross-bar J. The end parts of the cross-bars J O rest upon the upper ends of the bars S T, which pass down through the guides U, attached to the sides of the frame A, and their lower ends rest upon the cams V W, which may be made in one piece or separate, and are attached to the ends of the shaft X. The shaft X revolves in bearings attached to the frame A, and to one of its ends is attached the pulley Y, to which the power is applied. The endless carrier H passes around rollers Z, which revolve in bearings attached to the frame A. To one of the journals of the forward roller Z is attached a ratchet-wheel, $A^1$, with the teeth of which engages the pawl $B^1$. The pawl $B^1$ is pivoted to the upper part of the lever C', which rides upon the journal of the roller Z, and to the lower end of which is pivoted the forward end of the connecting-rod D'. The rear end of the connecting-rod D' is pivoted to a crank-pin attached to the cam W. The lower end of the pawl $B^1$ is made forked, so that by adjusting the said pawl $B^1$ to bring one or the other of its branches into contact with the ratchet-wheel $A^1$, the carrier H may be carried in either direction by the shaft X, always revolving in the same direction. The pawl $B^1$ is held in place, when adjusted in either position, by a spring, E', attached to the wide upper end of the lever C'. The spring E' rests upon a shoulder formed upon, or a pin attached to, the pawl $B^1$, and is covered and protected by a flange formed upon the upper end of the lever C'.

To the driving-shaft X is attached a bevel-gear wheel, F', the teeth of which mesh into the teeth of the bevel-gear wheel G', attached to the forward end of the shaft H'. The shaft H' revolves in bearings attached to the frame A, and to its rear end is attached a bevel-gear wheel, I', the teeth of which mesh into the teeth of the bevel-gear wheel J', attached to the cross-shaft K'.

The shaft K' revolves in bearings attached to the frame A, and to its ends are attached two gear-wheels, L'. One of the gear-wheels L' meshes into a gear-wheel, M', which runs loosely upon the end of the cross-shaft N'. The other gear-wheel L' meshes into the intermediate gear-wheel O', pivoted to the frame A, and the teeth of which mesh into the teeth of the other gear-wheel M', running loosely upon the other end of the shaft N'.

The shaft N' revolves in bearings attached to the frame A, and may be revolved in one or the other direction, according as one or the other of the wheels M' are thrown into gear.

To the shaft N' are attached two bevel-gear wheels, P', the teeth of which mesh into the teeth of the two bevel-gear wheels, Q', attached to the rear ends of the two screws R'. The screws R' are swiveled to the frame A, and pass through nuts secured in the end parts of the cross-bar S', or through screw-holes formed in the said bar.

To the bar S' are rigidly attached the stems or rear ends of the plungers D, so that the said plungers D may be pushed forward or drawn back, according as the screws R' are turned in one or the other direction.

Upon the shaft N' are placed two sliding clutches, T', to engage with the inner ends of the hubs of the loose gear-wheels M', so that either of said wheels M' may be made to carry the shaft N' with it, as desired, by shifting the clutches T'. Around the clutches T' are formed ring-grooves, to receive the forked ends of the arms U', which are rigidly attached to the ends of the cross-bar V'. The cross-bar V' is slotted to receive the bolts by which it is secured to and allowed to slide upon the frame A, or it may slide in keepers attached to said frame A, so that by the movement of the bar V' either of the clutches T' may be thrown into gear with its gear-wheel M', as required.

To the sliding bar V' is pivoted the end of the connecting-rod W', the other end of which is pivoted to an arm of the bent lever X'. The bent lever X' is pivoted at its angle to the frame A, or to a bracket, arm, or other support attached to said frame, and to its other arm is pivoted the rear end of the bar Y', which slides in guides or keepers attached to the frame A.

To the sliding bar Y' are attached two arms, Z', near the ends of the swiveled screws R', against which the end of the cross-bar S' strikes as the follower D completes its movement in either direction, so as to operate the clutches T', and reverse the motion of the follower D automatically at the proper time.

To the sliding bar V' is pivoted the end of a connecting-bar, A², the other end of which is pivoted to the lever B². The end of the lever B² is pivoted to the frame A, or to a bracket, arm, or other support attached to said frame, so that the clutches T' may be shifted to reverse or stop the motion of the follower D by hand.

Having thus described my invention, I claim as new and desire to secure by Letters Patent—

1. The combination of movable plungers M with the hollow cutters G, the cutter-plate F, and the dough-box B, of a cake-machine, substantially as herein shown and described.

2. The combination of the plungers M, the cross-bar O, and its spring P and stops R, the two pairs of sliding bars S T, and the two pairs of cams V W, with the cutters G, the cross-bar J, and the driving-shaft X, substantially as herein shown and described.

3. The combination of the ratchet-wheel A¹, the forked pawl B¹, the lever C', the spring E', and the connecting-rod D' with the roller Z of the endless carrier H, and with the driving-shaft X, substantially as herein shown and described.

4. The combination of the slide-bar Y', provided with the two arms Z' Z', the bent lever X', and the sliding bar V', provided with the forked arms U' U', with the cross-bar S', of the plungers D and the clutches T' T', for throwing the gear-wheels M' M' into and out of gear with the swiveled screws R' R', that operate the plungers D, substantially as herein shown and described.

5. The combination of the two gear-wheels L' M' and the three gear-wheels L' O' M' with the shafts K' N', clutch T', and a suitable operating mechanism, to enable the shaft N' to be driven in either direction by the continuous movement of the shaft K' in the same direction, substantially as herein shown and described.

DANIEL M. HOLMES.

Witnesses:
JAMES T. GRAHAM,
C. SEDGWICK.